United States Patent [19]
Henkelmann et al.

[11] 4,130,353
[45] Dec. 19, 1978

[54] PROJECTOR WITH CONTROLS FOR THE SLIDE CHANGER

[75] Inventors: Kurt Henkelmann; Rolf Speier, both of Wissmar; Wilhelm Schäfer, Wetzlar, all of Fed. Rep. of Germany

[73] Assignee: Ernst Leitz Wetzlar GmbH, Wetzlar, Fed. Rep. of Germany

[21] Appl. No.: 860,204

[22] Filed: Dec. 13, 1977

[30] Foreign Application Priority Data

Dec. 20, 1976 [DE] Fed. Rep. of Germany ....... 2657697

[51] Int. Cl.$^2$ ...................... G03B 21/20; G03B 23/04
[52] U.S. Cl. ........................................ 353/85; 353/92; 353/116
[58] Field of Search ................... 353/85, 92, 114, 116, 353/117, 88

[56] References Cited

U.S. PATENT DOCUMENTS

| | | | |
|---|---|---|---|
| 2,916,965 | 12/1959 | Jungjohann | 353/92 |
| 2,978,823 | 4/1961 | Klund | 353/92 |
| 3,067,650 | 12/1962 | Pester | 353/92 |
| 3,910,696 | 10/1975 | Mulch | 353/116 |

*Primary Examiner*—Steven L. Stephan
*Attorney, Agent, or Firm*—Gilbert L. Wells

[57] ABSTRACT

A slide projector with controls for the slide changing system and for the stop associated with the slide changing system where there are separately moving insertion and storage feeder arms for the slide changer, and at least two routes for inserting and removing the slides. Preferred motor driven cams (B",R",S",T") act as controls for the stop (8,11) and for slide changing and are operationally timed so that the closing process for the stop is initiated simultaneously or nearly simultaneously with the beginning of the removal of the projected slide (19a) from the slide stage plane and with the insertion of a new slide (19c). The process of stop opening begins immediately and without any pause after the complete closure of the stop which coincides with the terminated insertion of the new slide. Interlocking means (14-18) are provided in the slide stage (20) which keep the stop closed in a change process where there is no slide insertion and which means are overridden when the first new slide is introduced or when the previous one is reinserted, the override taking place through the slide itself.

8 Claims, 6 Drawing Figures

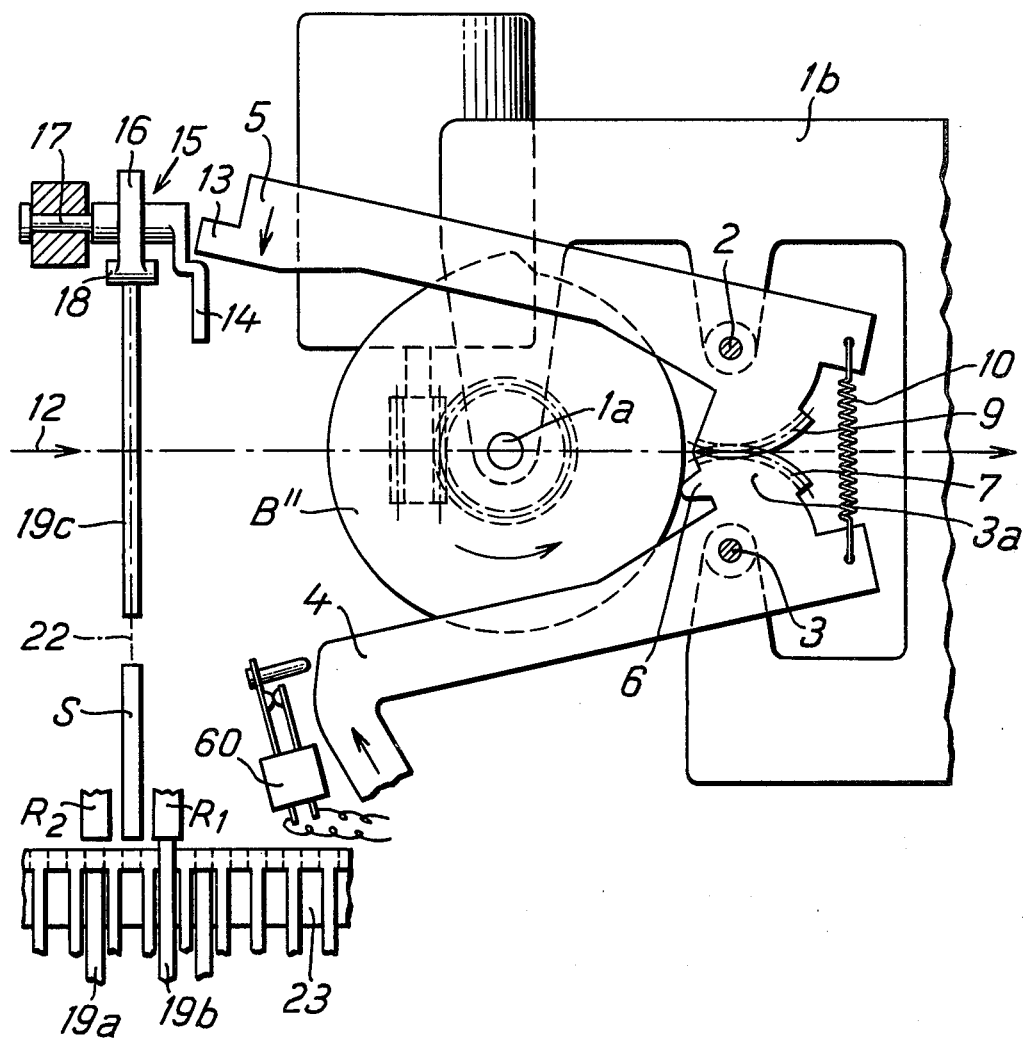

PROJECTOR WITH CONTROLS FOR THE SLIDE CHANGER

CROSS REFERENCE TO A RELATED APPLICATION

Applicants claim priority under 35 USC 119 for application Ser. No. P 26 57 697.6 filed Dec. 20, 1976 in the Patent Office of the Federal Republic of Germany.

BACKGROUND OF THE INVENTION

This present invention relates to a projector with controls for the slide changer and to the associated stop of the slide changer, where the slide changer has independently acting insertion and storage feeder arms for the changing system and at least two routes for inserting and ejecting the slides.

The state of the art of slide changing equipment for magazine slide projectors may be ascertained by reference to U.S. Pat. No. 3,910,696 Hans Mulch which issued Oct. 7, 1975, the disclosure of which is incorporated herein.

U.S. Pat. No. 3,910,696 discloses a system comprising independently acting slide feeder arms actuated by controls, where one of these arms inserts the slide into the slide stage and the other returns it by a special route to storage. Slide changing in this system takes place so that with insertion of a new slide, the previous slide is removed from the slide stage. This patent further discloses that a stop may be provided for the changing system to prevent defocusing when changing. However, this disclosure does not specify either the design or the operation. It must be assumed therefore that the stop control of U.S. Pat. No. 3,910,696 is conventional.

Stop control is generally accomplished by controlling the stops by the slides themselves or by a component moving the slides. This ensures that at the beginning of slide removal, and so long as it remains wholly or partly within the projection window, the stop is closed and reopens only when the new slide is in its final position.

However, all of these prior art systems suffer from the limitation that there is a relatively long dark pause between the individual projections. This is disadvantageous to an annoying degree for the viewer because the eye must constantly readapt. The viewer therefore tires rapidly.

If on the other hand there is no stop, so that the prior art system remains open, a wiper effect occurs between the individual slide changes, which is unpleasant and disrupting.

SUMMARY OF THE INVENTION

Having in mind the limitations of the prior art, it is an object of the present invention to remedy the drawbacks and to create a system practically reducing the dark pause to zero. In order to achieve this object, it is proposed to mutually adjust the controls for the stop and slide change, consisting of motor driven cams and actuated for the slide changes with respect to their timing operations, so that the closure of the stop begins simultaneously or nearly so with the beginning of the removal of the slide just projected from the slide plane and the introduction of the new one. Furthermore, the mechanism of stop opening begins directly and without pause following the complete stop closure coinciding with the completed insertion of the new slide. In another embodiment of the present invention, locking means are provided in the slide stage to keep the stop closed when there is a change without introduction of a slide, which are rendered inoperative when the first or new slide is inserted or another is reinserted, by the very act of such insertion.

Appropriately the control means are adjusted so that the stop will be precisely closed completely at the moment the image edge of the slide mask of the new slide has reached the optical axis of the projection system, that is, it must be impossible to see the displacement of the previous slide or the insertion of the new one on the screen.

Regarding slide projectors provided with a transport (roller, etc.) for moving the slides from one route to another when changing them, the control means advantageously are adjusted so that the closure process of the stop occurs simultaneously with the beginning of the transport activation. This beginning also may be "pre-scheduled" so that the stop is already partly closed when transport actuation begins. The stop may consist of a single part, or it may comprise two parts which are operationally coupled and move in opposite directions.

When using double stops, the beginning of the closure process is advanced in such a manner that the closing edges already have reached the level of the image boundaries in the case of large format slides at the beginning of roller activation. This substantially reduces the slight blurring that still remains. The two stop halves preferably are biased by a return spring pulling them into the open position. Because the process of stop closure is rigorously related to the duration of insertion of a new slide into the slide state, the associated part for the stop control switching is designed accordingly. Independently therefrom, stop opening must take place as rapidly as possible. Therefore this part of the switching cam is designed to be relatively steep. The stop control cam therefore is asymmetrical.

The lock for preventing the stop from opening in a changing process without slide introduction appropriately consists of a spring-biased bell crank with one arm in the plane of the slide stage in the exit path of the slide and with the other arm functioning in concert with a stopping brace on the stop.

The invention further provides that in those projectors which comprise a switching mechanism for turning on and off the projection lamp rather than comprising a stop system, this switching mechanism and the control for slide changing is so timed in their operation that turning off the lamp — where suitable by using a rheostat— take place simultaneously or nearly simultaneously with the beginning of the removal of the just projected slide from the slide stage plane and with the insertion of a new slide, so that the lamp is turned on without pause and is fully incandescent the moment the new slide is fully inserted.

BRIEF DESCRIPTION OF THE DRAWINGS

The present invention is best described by reference to the appended drawings which show embodiments of the invention, wherein:

FIG. 6 shows a further embodiment wherein the stop associated with the slide changer is replaced by a switching mechanism for turning the projection light on and off.

DESCRIPTION OF THE PREFERRED EMBODIMENTS

Figure 1:
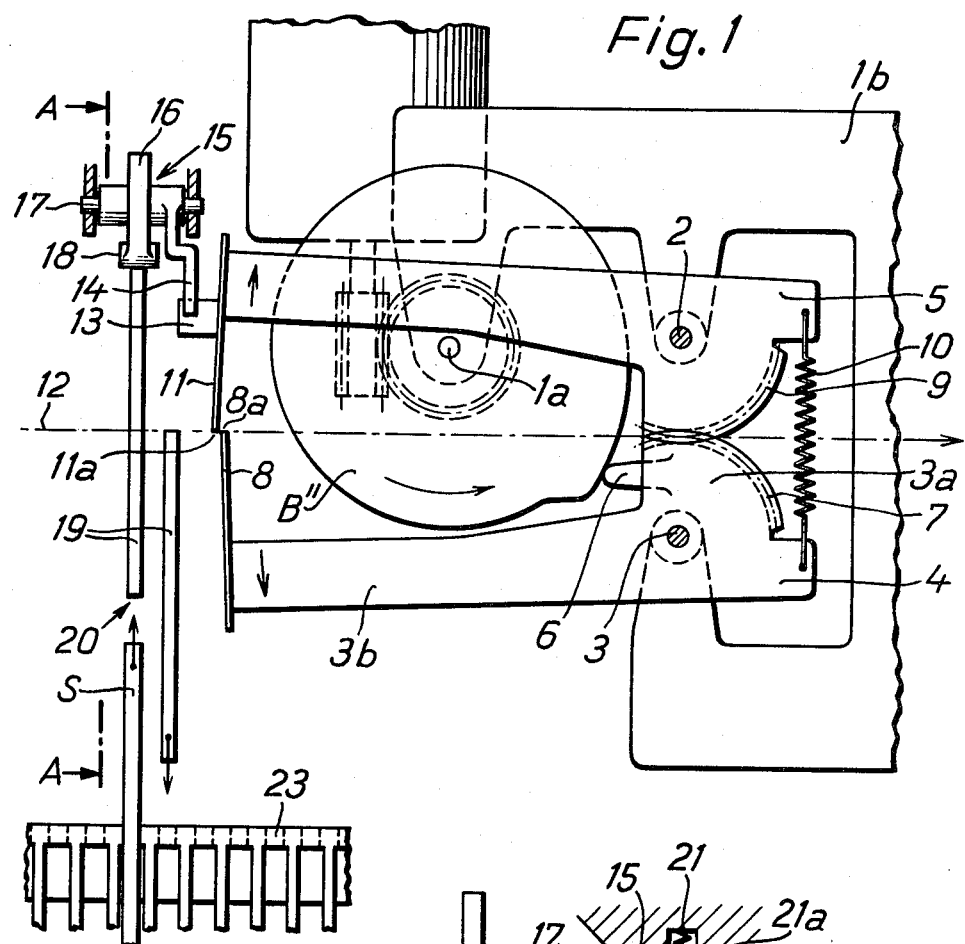
FIG. 1 is a top view showing a control mechanism for the stop of a slide projector.
Figure 2:
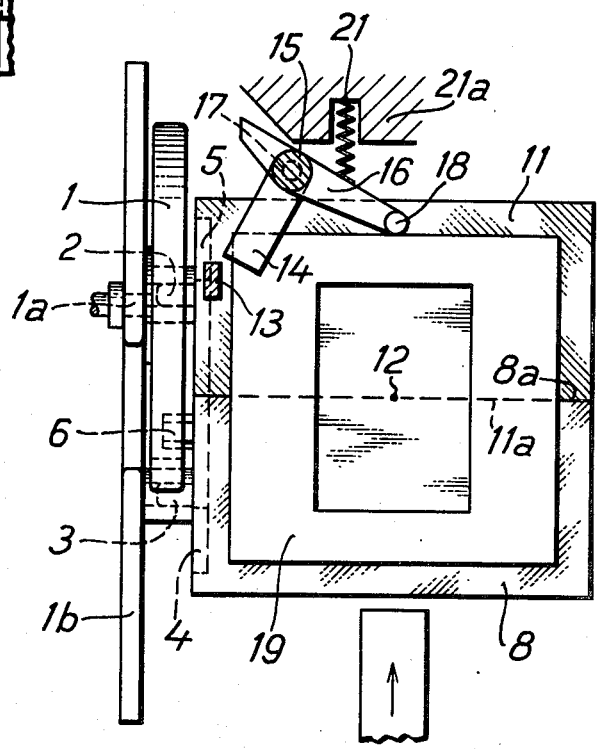
FIG. 2 is the corresponding side view along line A/A of FIG. 1.

With particular reference to FIGS. 1 and 2 it is shown that cam B" controls the stop mechanism, supported at 1a on a plate 1b and driven by a motor to effect slide changing. The control cam B" is one cam in a package of a plurality of control cams, such as M", R", S", T", which are described in more detail hereafter with reference to FIG. 5.

The stop mechanism comprises essentially the two rocking levers 4 and 5 pivoting about shafts 2 and 3. Lever 4 has a beak 6 operationally engaged with cam B". The shorter lever arm 3a bearing the beak 6 is provided with a gear segment 7. The longer lever arm 3b supports stop mask 8. Rocking lever 5 is of the same design as lever 4 and by its toothing 9 engages gear segment 7 of lever 4. Both levers are stressed by spring 10. The stop mask of lever 5 is designated by 11.

Both masks together from the stop consisting of two halves, of which the edges 8a, 11a meet approximately at the optical axis in the closed state.

Rotation of cam R" causes beak 6 to rotate rocking lever about shaft 3. On account of the meshing of the two gear segments 7 and 9, the other rocking lever 5 will be driven along and rotated about shaft 2. Spring 10 ensures that beak 6 will always be pressed against cam B".

Stop half 11 is provided with a tab 13 functioning jointly with arm 14 of an interlocking lever 15. The other arm 16 of this interlocking lever — which rotates about hub 17 — is provided at its free end with a scanning element 18 which penetrates the slide stage 20 and is controlled by a slide 19 inserted into this stage. The interlocking lever is pressed into the locking position by spring 21 resting against shoulder 21a.

Figure 3:
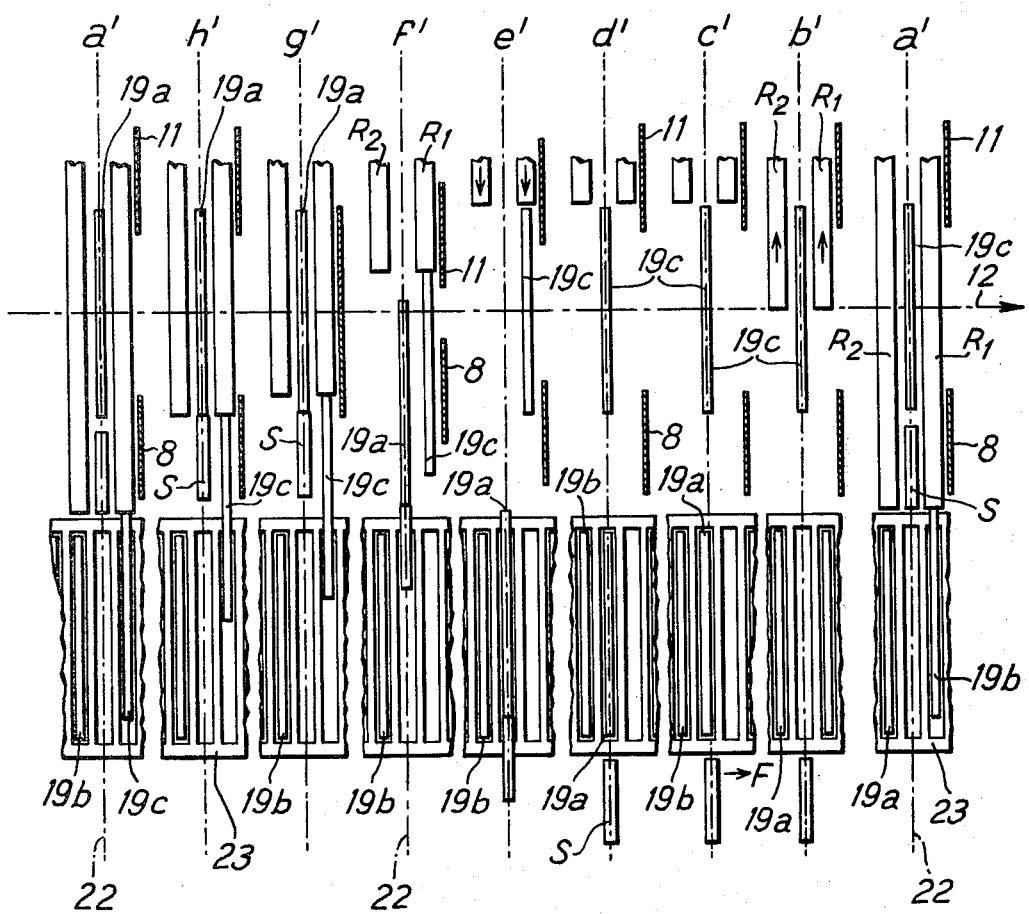
FIG. 3 is an overview of various phases or operational sequences of slide changing of the present invention.
Figure 4:
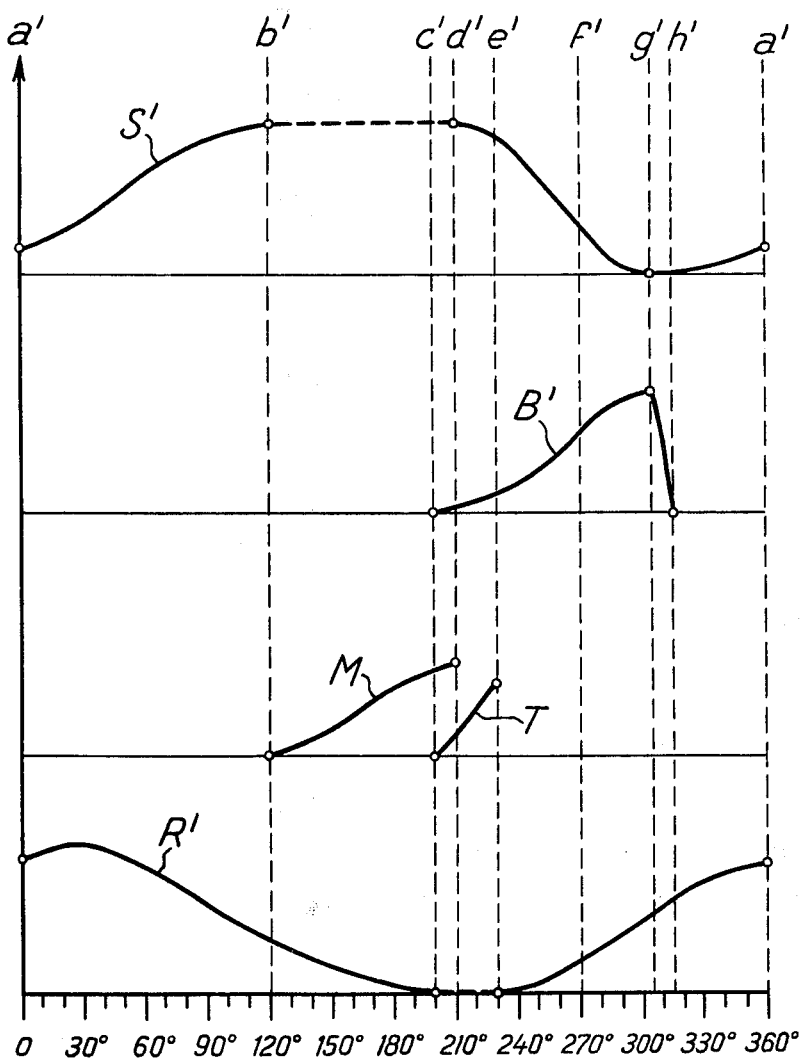
FIG. 4 is a diagramatic showing of the displacement of the control components for the stop and the slide changer for the operational sequence of the present invention.
Figure 5:
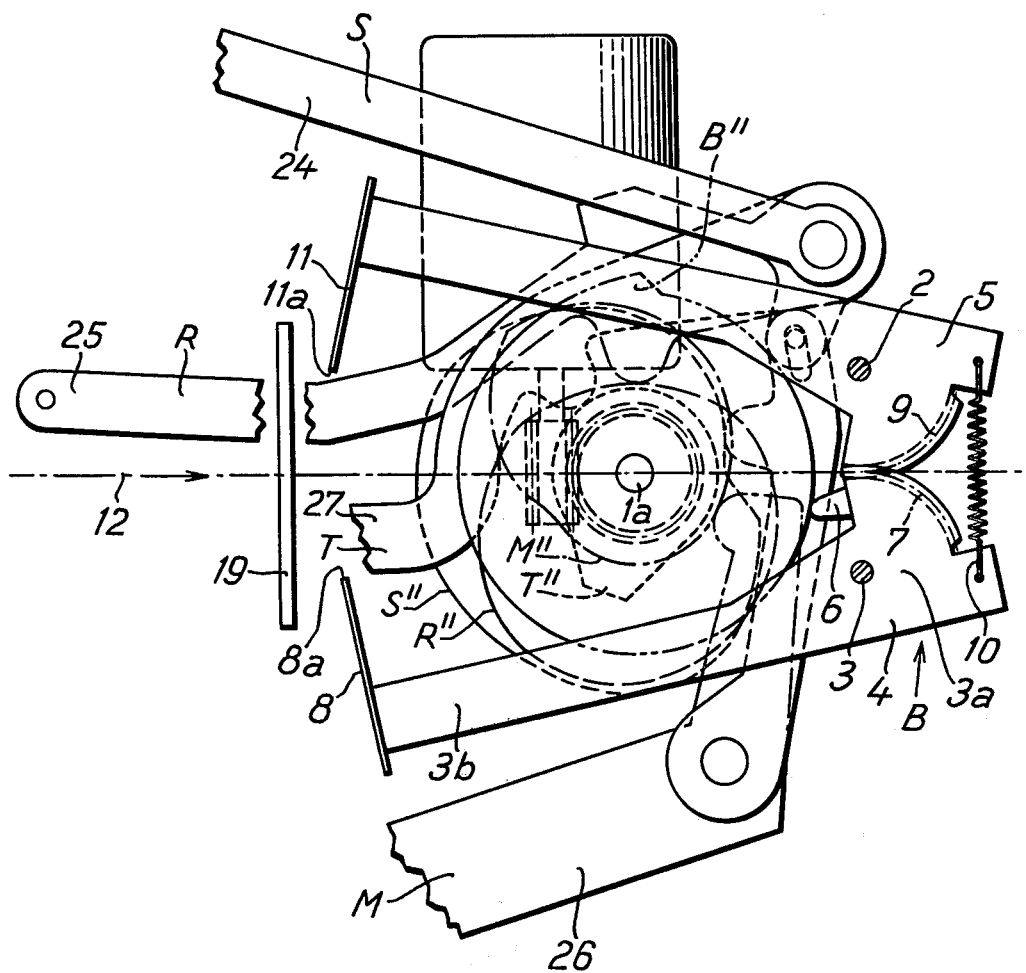
FIG. 5 is a top view of all the control components.

When a slide 19 is inserted, its front edge during the last phase in reaching its end position in the slide stage touches sensing element 18. The interlocking lever is thus rotated and thereby clears the way for opening the stop. The stop opening takes place uniquely as a function of the position of cam B". The relationship between stop control and slide change is shown in FIGS. 3 through 5. FIG. 3 shows the various stages of changing slides in diagramatic form. The dashed line indicates the path for inserting the slides 19 from magazine 23 and simultaneously represents the plane of slide stage 22. Insert feeder arm S moves in that plane. Storing feeder arms R1 and R2 are associated with the two return routes on either side of the slide stage plane. Stop halves 8 and 11 are located in front of feeder arm R1.

FIG. 4 shows the motions of the control components for slide changing and for operating the stops 8 and 11. Curve S' represents the motion of feeder arm S, and curve R' that of storage feeder arms R1 and R2. The stop control curve is denoted by B' and the stages for magazine transport and slide advance from one slide path to the other denoted respectively by M and T.

FIG. 5 shows the actual shape of the curves and also the position and the design of the sensing or transmission elements. Feeder arm S is controlled by cam S". Cam R" is provided for the motion of storage feeder arms R. corresponding to this notation, the components for the stop, magazine transport, and slide advance at the slide stage are respectively denoted by B", M" and T".

Transmission system 24 is associated with feeder arm S and storage feeder arms R with sensing arm 25. As already explained above, the two rocking levers 4 and 5 are provided for the stop. Bell crank 26 connected with M" is used to control the magazine transport, and hinged arm 27 is used as the displacing member for the slide displacement in the slide stage from one route to the other, which is carried out by a transport roller as disclosed in U.S. Pat. No. 3,910,696.

The operational sequences take place according to FIGS. 3 and 4 wherein phase a' in FIGS. 3 and 4 shows the initial position prior to a new change of slides. Slide 19c is located in the position of projection in the plane of the slide stage. Slide 19b is being stored back into the magazine but has not yet quite reached it final position. The insertion feeder arm assumes a position between the slides position of projection and the magazine. The stop is open.

As the slide change begins, the feeder arm S moves through the empty drawer in the magazine back into its other end position to be ready for the insertion of a new slide. Simultaneously the return motion of the storing feeder arms R1, R2 begins (phase B') in the direction of the arrows.

Magazine transport takes place in the following phase b'/c'. Depending upon whether a new slide is to be shown or the previous one is to be repeated, the magazine will advance or reverse.

An advance in direction of arrow F has taken place in the drawing of FIG. 3 and is almost completed in position c'. The storage feeder arms are presently in their end positions. The slide change proper begins now, by removing slide 19c from the slide stage in the direction of the optional axis (displacing member 27 (FIG. 5) of the transport roller). The stop is actuated simultaneously. After termination of the magazine transport, there is simultaneous ejection of the new slide 19a during an intermediary phase d'.

It is seen from position e' that the displacement of slide 19c in the direction of the optical axis is over and that the storage feeder arms are about to be set in motion in the direction of the arrows. Because of the displacement of slide 19c, the objective of the projector no longer is precisely focused on the slide plane. But there being sufficient depth of field, this offset is not disagreeably noticeable in the very short time it is present.

In position f', the control elements for slide changing and for the stop have covered about half their way since the slide change proper began. The stop is almost closed, that is, the motions of slide insertion and removal are only evident to the eye through the decaying screen illumination.

Shortly thereafter, in position g', the stop closes completely. The newly inserted slide 19a is in its end position in the slide stage, though the rejection of the previously shown slide 19c is not complete yet. Increasing (screen) darkening takes place during the time interval e'-g' in which a slide displacement in the image stage plane may be observed.

The stop opens immediately after fully closing and is completely open after a very short time (position h'). Control cam B" (FIG. 3) is designed to be appropriately asymmetrical to that end. The storage feeder arms and also the insertion feeder arm are returned to their initial position a' in the final stage of the slide change.

FIGS. 3 through 5 show that the stop closing process begins simultaneously with the removal of the projected slide from the slide stage plane in the direction of the optical axis. Transport T as disclosed in U.S. Pat. No. 3,910,696 is essential for this slide displacement; and the subsequent storage of the slides takes place by means of storage feeder arms R/phase a'. A new slide is then inserted by means of feeder arm S'.

The operating parts furthermore are so adjusted with respect to each other that complete stop closure coincides with the completed insertion of a new slide and that furthermore this is immediately followed by opening the stop (phase h').

In the embodiment shown in FIG. 6, the stop associated with the slide changer is replaced by a switching mechanism for turning on and off the projection lamp. To this end the stop masks 8 and 11 have been deleted and a micro switch 60 has been introduced. FIG. 6 shows the elements during a projection phase when the projection lamp is turned on and a slide is in the slide stage.

The switch is opened by the lever 4 when the latter starts moving during the phase c'-d' (FIG. 4). Opening of the switch results in turning off the projection lamp so that the slide exchange is performed in complete darkness.

After completion of the slide exchange the levers 4 and 5 open immediately due to the asymmetrical shape of the control cam B" and the pull of the spring 10. This results in a sudden turning on of the projection lamp.

We claim:

1. In a slide changing apparatus for magazine slide projectors having slide pushrods driven by control means, one of said pushrods serving to insert the slides into an image aperture and the other to move back those slides that have been projected into the magazine, a transport path and a projecting stage located in a common plane and the insertion pushrod serving to insert slides along said path, a slide return path located alternatively on either side of said common plane, driving means transporter means actuated said driving means to transport a slide that has been projected from said projecting stage to said return path, and also to transport said magazine in the same direction, said other pushrod acting to move a slide that has been transported to said return path along said return path back to said magazine, said transporter means being operable alternatively to move a slide to either side of said common plane to give either a forward or reverse operation, said control means being operative so that the pushrods and the driving means operate to move a slide from the magazine to the projection stage, then to the return path, and then back to the magazine, the improvement comprising:

stop means (8,11) actuated by said control means, said control means comprising motor driven cams (B", R", S", T") with surfaces thereon for initiating closing of said stop means simultaneously with removal of a first slide from said projection stage and the movement of a second slide to said projection stage and initiating opening of said stop means after the complete closure of said stop means which coincides with the terminated insertion of said second slide, and interlocking means (14-18) provided in said projection stage (20) maintaining said stop means closed in change processes lacking slide insertion and means for overriding when said second slide is introduced or when said first slide is reinserted, said means for overriding acting through said slides themselves.

2. The slide changing apparatus of claim 1, wherein said cam surfaces initiate removal of said first slide prior to closure of said stop means.

3. The slide changing apparatus of claim 1, wherein said cam surfaces actuated closure of said stop means simultaneously with actuation of said transport means.

4. The slide changing apparatus of claim 1, wherein said stop means comprise two oppositely moving parts (8,11) operationally coupled together.

5. The slide changing apparatus of claim 4, each of said moving parts having a stop half, a return spring (10) actuating said stop halves into an open position, and a holding beak (13) on one of said moving parts.

6. The slide changing apparatus of claim 5, wherein at least one of said cam surfaces has an asymmetrical boss actuating said stop means.

7. The slide changing apparatus of claim 6, having a bell crank (15) under spring bias, said interlocking means comprising an interlocking member actuated by said bellcrank, said interlocking member having a first arm (16) positioned in said projection stage and a second arm (14) operating jointly with said holding beak (13).

8. The slide changing apparatus of claim 1, wherein said stop means is a switching mechanism for turning a projection lamp on and off.

* * * * *